United States Patent [19]

Bihrle, Jr.

[11] 4,040,583

[45] Aug. 9, 1977

[54] METHODS AND APPARATUS FOR EFFECTING RECOVERY OF A HIGH SPEED AIRCRAFT FROM A CONDITION OF INCIPIENT OR DEVELOPED SPIN

[76] Inventor: William Bihrle, Jr., 284A Tennis Court Road, Cove Neck, N.Y. 11771

[21] Appl. No.: 656,029

[22] Filed: Feb. 6, 1976

[51] Int. Cl.² .......................................... B64D 17/80
[52] U.S. Cl. .................................................. 244/113
[58] Field of Search ................. 244/113, 110 D, 90 R, 244/139

[56] References Cited

U.S. PATENT DOCUMENTS

| | | | |
|---|---|---|---|
| 1,889,038 | 11/1932 | Nouslakis | 244/139 |
| 1,890,190 | 12/1932 | Papp | 244/139 |
| 1,940,950 | 12/1933 | Honeywell | 244/139 |
| 2,631,797 | 3/1953 | Smith | 244/113 X |
| 3,036,795 | 5/1962 | Sinclair | 244/113 |

Primary Examiner—Trygve M. Blix
Assistant Examiner—Barry L. Kelmachter
Attorney, Agent, or Firm—Larson, Taylor and Hinds

[57] ABSTRACT

A method of effecting recovery of a high speed aircraft from a condition of incipient or developed spin involves, upon entry into the condition, deploying at least one parachute coupled only to the forebody of the aircraft forward of the center of gravity, and is particularly effective in recovering from a flat spin. After recovery, the chute or chutes can be collapsed, released or retracted. The chute is deployed in response to predetermined angle of attack and yaw rate of the aircraft, which may be accomplished automatically under the control of spin condition sensing means. The chute is highly effective because of its location, and hence may be relatively small, the size of the chute, when deployed being such as to have a negligible influence on the free falling rate of sink of the aircraft. The chute or chutes themselves may be conventional, typically of the pilot chute size employed to extract the main chute from a personnel parachute pack, and can be mounted in packed condition on the forebody fuselage or within the fuselage.

14 Claims, 6 Drawing Figures

METHODS AND APPARATUS FOR EFFECTING RECOVERY OF A HIGH SPEED AIRCRAFT FROM A CONDITION OF INCIPIENT OR DEVELOPED SPIN

FIELD OF THE INVENTION

This invention relates to spin control and recovery apparatus for use in high speed aircraft for effecting recovery of the aircraft from a condition of incipient or developed spin, and to methods of effecting such recovery, so as to regain control of the aircraft when it is in a spin. In particular, the invention relates to such apparatus and methods which are particularly suited for use on prototype full-scale spin demonstration fighter aircraft, and involves at least one parachute coupled only to the forebody of the aircraft forward of the center of gravity. The invention is, however, useful in production aircraft for spin recovery.

BACKGROUND AND SUMMARY OF INVENTION

All fighter aircraft projects are contractually required to perform a full-scale spin demonstration program. The purpose of the flight test program is to identify the types of spins that could be encountered inadvertently during future operational use of the aircraft, and the control techniques that are required to return the aircraft to the normal flight regime. Other purposes for these programs could include the demonstration of aerodynamic configurations that are spin resistant, automatic spin avoidance and/or recovery techniques, etc. In any event, spin demonstration aircraft are required now and will be required in the future, and these aircraft must be eqipped with an emergency recovery ststem that is guaranteed to terminate any otherwise unrecoverable spin mode that might be encountered.

One spin mode to which modern fighter-type aircraft are susceptible is the flat spin, wherein the aircraft exhibit "spinning top" motions. This type of spin usually has a high rate of rotation, an angle of attack between 70° and 90°, and effectively no spin radius, the aircraft spinning about an axis that passes through or near the center-of-gravity of the aircraft. Because an aircraft usually cannot recover from a developed flat spin through manipulation of the available aerodynamic controls, it is the spin which pilots fear most.

To maintain a flat spin or any other type of spin, the aircraft must balance the nose-down aerodynamic pitching moment with an opposing gyroscopic pitching moment. The magnitude of the aerodynamic pitching moment is a function of the aircraft configuration, dynamic pressure and angle of attack (usually increasing progressively up to 90° angle of attack). The magnitude of the gyroscopic pitching moment is a function of the mass distribution and the product of the roll and yaw rates generated about the aircraft body axis. In a flat spin, the yaw rate is considerably greater than the roll rate. The yaw rate required for spin equilibrium is determined by the magnitude of the aerodynamic pitching moment and the aircraft mass distribution. The other requirement for spin equilibrium is that the aerodynamic yawing moment about the body yaw axis be zero (actually very slightly propelling, i.e., pro-spin) at this yaw rate. Obtaining a flat spin requires, therefore, that a propelling aerodynamic yawing moment be generated at yaw rates below that required for balancing the aerodynamic pitching moment and that the magnitude of this yawing moment decrease (approaching a zero value) as the required yaw rate is attained. If a damping (anti-spin) yawing moment is generated below and at the required yaw rate the flat spin cannot be maintained.

Emergency recovery systems used to date to generate an anti-spin yawing moment are complex, and usually incorporate a tail chute which is extremely inefficient when installed on modern aircraft that spin flat. In some instances, the chute size which is required for a particular type aircraft becomes impracticably large. In addition, the length of the riser line that attaches the tail chute to the aircraft is critical. If the riser line length is too short, the chute tends to collapse in the low dynamic pressure and reversed flow field that exists above the aircraft. If the riser line length is too long, the chute trails the aircraft at an angle which results in a nose-down pitching moment but no anti-spin yawing moment. Even the optmum riser line length results in a chute trail angle that contributes only a small antispin yawing moment. To compensate for the small anti-spin yawing moment, large parachutes are used. However, the use of large chutes results in off-design loads on the aircraft, which necessitates extensive internal and external reinforcement of the fuselage. In some cases, the reinforcement of the fuselage incurs changes in the mass distribution and external shape of the spin demonstration aircraft which jeopardizes the applicability of the results obtained from the testing.

National Aeronautics and Space Administration has published a survey of spin-recovery devices and techniques, including rockets and wing-tipped mounted parachutes, but with particular emphasis on approaches in the design of tail-mounted spin-recovery parachute systems, including a compilation of design considerations applicable to spin-recovery parachute systems. The survey is published as NASA Technical Note D-6866, entitled "Summary of Design Considerations for Airplane Spin-Recovery Parachute Systems", by Sanger M. Burk, Jr., published in August, 1972. The disclosure of that publication is herein incorporated by reference, since many forms of apparatus disclosed therein are usable in my invention, even though my invention involves a basically contrary approach. The publication is also noteworthy in that it evidences the complexity of the problems involved and the great deal of effort which has gone toward their solution.

Reference is here made also to my copending application, Ser. No. 570,505, filed Apr. 22, 1975, for Aerodynamic Spin Control Device for Aircrafts, wherein I disclose and claim a different solution to the same general problem, involving the use of doors or like devices mounted in the forebody of the aircraft so as to be deployable outwardly under spin conditions so as to change the fuselage yawing moment from pro-spin to anti-spin by changing the flow field over the fuselage forebody at high angles of attack, by effectively changing the geometric characteristics of the forebody.

As indicated in the NASA publication referred to above, emergency spin recovery parachute systems have been traditionally attached to the aft end of the fuselage, although wing-tip-mounted parachutes have been given consideration, with notable lack of success. The tail-mounted technique resulted in a reasonably efficient recovery system for aircraft developed during the 1930-1950 time period. Since then, however, radically different airframe-propulsion configurations have evolved for which I consider this system to be unsuited. The efficiency of this technique progressively deteriorated over the years as the total plan form area increased, the distance between the center-of-gravity location and aft end decreased, and a greater proportion of the mass became concentrated in the fuselage. As the efficiency eroded, the complexity, size, and structural attachment load of the recovery installation escalated correspondingly. For some recent designs, the required structural modification costs have reached an absurd level.

The major components of a conventional emergency spin recovery system installed at the aft end of the fuselage are: a deployment motor or gun, pilot chute, bridle line, deployment bag, riser line, ring slot or ribbon-type main chute, chute inflating device, and a chute tiedown and release mechanism. This emergency system is usually deployed during a flat spin, which is the most difficult spin to terminate, this being the case since the spin rate is the highest achievable while the aerodynamic controls required for recovery are operating at their lowest effectiveness. Also, the use of the controls may be lost completely on some aircraft after an engine flame-out is experienced. Unfortunately, when the need is greatest for the emergency system it is grossly inefficient since by virtue of its location on modern aircraft, which spin about a vertical axis passing through the center of gravity, only a small portion of the chute load produces the anti-spin yawing moment required for overcoming the spin rotation, whereas most of the chute load applies a nose-down pitching moment which generates a gyroscopic pro-spin yawing moment on current aircraft which have more of their mass concentrated in the fuselage than along the wing. Obviously, attachment of the recovery chute to the aft end of a high performance aircraft does not employ the laws of nature in an optimum manner but attempts to oppose them instead.

The inefficiency of the tail-mounted chute location dictates the need for a large chute, which incurs a need for a major structural beef-up (accomplished internally and/or externally), an undesirable change in external lines, an undesirable increase in the inertia and change in the mass distribution, a bulky installation requiring special packing, inspection, etc. to keep size to a minimum, and a need for separating the chute from the aircraft before regaining normal flight. It should be noted that in one instance a 48 feet diameter chute attached to a 130 feet riser line was found to be inadequate. Also, the chute location is inefficient on other grounds which dictate additional severe design requirements. For example, the chute and riser line must be protected from heat before, during and after deployment of the system. The system must be designed to ensure minimum contact with aircraft structure, that is, avoid fouling of pilot chute and cuts and abrasion on riser line. The chute must trail in a stable position (not oscillate) to ensure an anti-spin yawing moment. This dictates the need for a high porosity type chute which requires an inflation device. The riser line length is critical, therefore, hopefully chosen properly since the main chute will collapse in the low $q$ (dynamic pressure) reversed flow field above the aircraft if the line is too short. If it is too long, no anti-spin yawing moment is generated.

The consequences of the described inefficiencies are high cost, long lay-ups of the test vehicle, system complexity, and a need for extensive (yet unsatisfactory) checkout system tests for evaluating a configuration which no longer represents the production vehicle. In addition, chute redundancy is not feasible, nor can installation on a production aircraft be considered.

My invention incorporates a very small pilot type chute or chutes which can be stored on or in, and attached to, the nose of the aircraft, and which can be deployed therefrom. This device is highly effective because the chute location in operation takes advantage of the aircraft characteristics inherent in a high performance aircraft. For example, at deployment the total chute load applies a side force through a large moment arm and, consequently, a significant aerodynamic anti-spin yawing moment. As the rotation rate decreases and the chute realigns itself with the relative wind, a portion of the chute load applies a normal force and therefore a nose-up pitching moment which creates a gyroscopic anti-spin yawing moment. The chute operates in a relatively free-stream environment.

Since the nose chute is extremely efficient, the chute size and corresponding load are very small, Therefore, no structural beef-up or external modifications are required, and no weight, inertia or mass distribution change need be incurred. This location also allows the use of an unstable chute. A low porosity chute can therefore be employed which in turn minimizes the required size and volume and needs no inflation device. The efficiency can be further enhanced through the use of sequenced chutes which are preprogrammed in an optimal fashion. A sequenced chute system, therefore, employs chutes which are smaller in size than would be required for a single chute system.

In keeping with my invention, the parachute is deployed upon entry into a condition of incipient or developed spin, which deployment may be by the pilot upon entry into the spin, or in the incipient spin phase in response to a predetermined angle of attack and yaw rate sensed by a conventional air data computer, or automatically under the control of a spin condition sensing means carried by the aircraft. Although the chute size is variable, as one typical measure of size it may be said that the size of the chute, when deployed, is such as to have a negligible influence on the free falling rate of sink of the aircraft. For most aircraft, a maximum chute diameter of less than 10 feet is appropriate. When mounted or coupled forward of the cockpit, the dimensions of the chute should be such that the deployed chute can be collapsed against the side of the fuselage during a spin recovery dive without interfering with pilot visibility. The chute itself, or the chutes, may be considered as conventional, and may be mounted externally on the fuselage in a conventional chute bag, or may be housed in a special housing inside the fuselage and deployed therefrom in what may be considered a conventional manner.

I am aware that there have been previously proposed various arrangements of parachutes in the nose portion of an aircraft, although for completely different purposes, these purposes being typically to hopefully lower an aircraft gently to the ground after a power failure. A typical example is found in Frost U.S. Pat. No. 2,673,051, issued Mar. 23, 1954, wherein a large supporting parachute is housed in the nose portion of a propeller driven VTOL aircraft so as to be deployable during vertical takeoff or landing in the event of a power failure. As a supporting parachute, the parachute would have to be necessarily quite large, and there is no relationship between the concept of this arrangement and my invention. A further typical example is found in Krahel U.S. Pat. No. 2,352,721, issued July 4, 1944, wherein large parachutes are coupled to the nose and other portions of the aircraft so as theoretically to lower the aircraft to the ground and prevent a crash. British Pat. No. 1,057,362, published Feb. 1, 1967 (McMahon and Brown) discloses a parachute arrangement for lowering a rocket to the ground, the parachute being coupled to the forebody of the rocket and to the tail portion. These examples are conceptually remote from my invention, but they constitute the only instances known to me wherein a parachute is coupled to the forebody of an aircraft, regardless of the purpose.

Other features and advantages of my invention will be set forth in or apparent from the following detailed description of presently preferred embodiments, taken in conjunction with the attended drawings.

DESCRIPTION OF PREFERRED EMBODIMENTS

Figure 1:
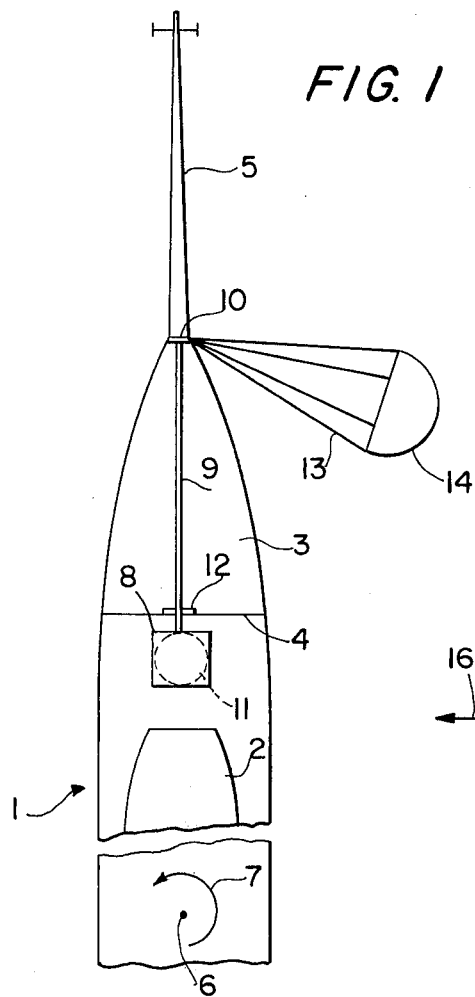
FIG. 1 is a diagrammatic plan view of a test aircraft embodying my invention, showing the nose chute in its housed positions and in the initial open chute position in a spin condition.
Figure 2:
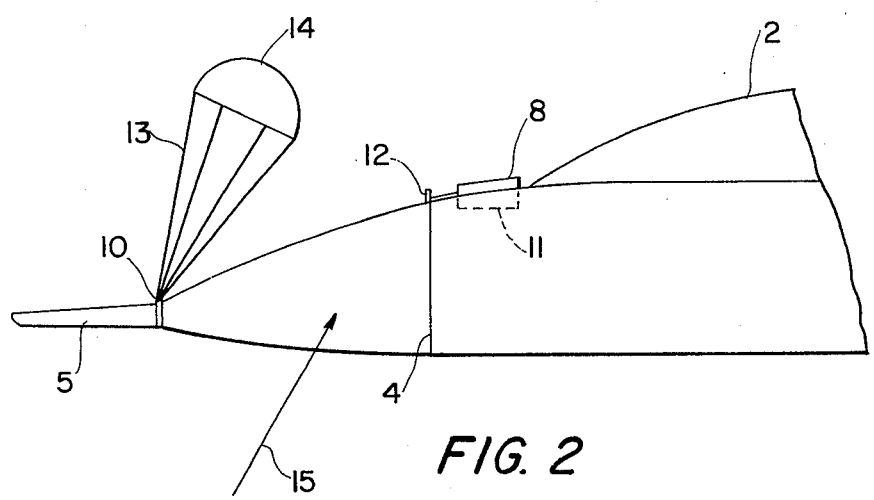
FIG. 2 is an elevation view taken from the left side of FIG. 1 showing the final chute position, with the relative wind vector during a left spin being indicated by the arrow.

Referring now to the drawings, particularly FIGS. 1 and 2, the forebody of a high speed aircraft is indicated generally at 1, the illustrated aircraft being a spin demonstration or test aircraft. Its center of gravity is shown at 6, with the canopy shown at 2. Reference character 3 designates a radome housing located forward of the first structural bulkhead 4. The instrument nose boom is shown at 5. Because of the very small size of the required chute or chutes, one or more sequenced solid flat type pilot chutes can be packaged and mounted externally in front of the cockpit windshield on the test aircraft as indicated at 8, with the secured suspension lines 9 extending forwardly and having their connecting "D" ring 10 attached to a known closed jaw-type clamp, which in turn is secured to the aircraft where the instrument boom enters the fuselage. In this manner, the chutes can be secured to the aircraft externally on the ground, and the status of the chutes and attachment verified at all times by the pilot. Additionally or alternatively, chutes can be mounted internally in a cylindrical container 11 and the "D" ring 12 attached to a closed jaw-type clamp secured to the first structural bulkhead 4 located in the nose. Thus, in test aircraft either or both arrangements may be used, but for production aircraft application, the internally housed arrangement would be used.

The spin recovery device is activated, for example, by the pilot by opening the chute bag and/or compartment after closing the latch of the jaw-type clamp and thereby locking the chute attachment mechanism. This can be accomplished in a number of ways which are not particularly unique to the device described herein, as will be discussed in more detail in connection with the insuing figures. FIG. 1 shows one chute comprising canopy 14 and suspension lines 13 in its initial open position after deployment, the spin direction being indicated by arrow 7. FIG. 2 illustrates the final position of that chute, with the relative wind vector being shown by arrow 15.

Figure 3:
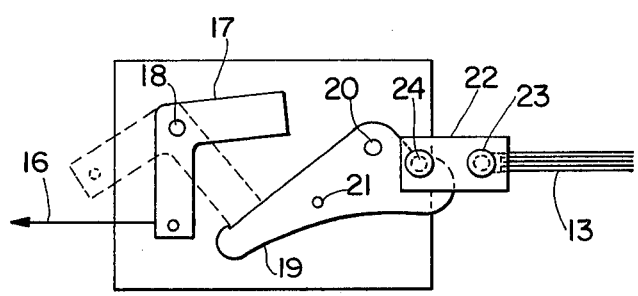
FIG. 3 is a diagrammatic view of an illustrative attachment and release mechanism for coupling the chute to the aircraft, this mechanism being known in the art and shown in more detail on Page 52 of the previously mentioned NASA publication.

FIG. 3 shows an illustrative attachment and release mechanism whereby the suspension lines are secured through their "D" ring to the aircraft. The suspension lines are shown at 13, and their "D" ring is coupled to a shackle 22 by a pin 23. Shackle 22 is in turn secured to the aircraft by a movable jaw member 19 which is pivotally mounted at 20, and held in the illustrated position by shear pin 21. A latch member 17 is pivotally mounted at 18 for latching and unlatching the movable jaw 19 through a control member 16 which extends to the cockpit. Latch 17 is shown in solid lines in its open position and in broken lines in its closed latched position. Latch 17 is in its open position and jaw 19 is in its closed position as shown for take-off, landing, and normal flight operation to allow for premature jettisoning of the parachute should it open accidentally. Thus, if premature parachute deployment occurs, the parachute load will shear pin 21, and permit jaw 19 to pivot clockwise so as to release pin 24, and hence shackle 22 and the parachute. For normal deployment of the parachute, latch 17 is moved to its closed position upon or prior to spin entry so as to retain the parachute in the jaws, thus coupled to the aircraft. The illustrated latched mechanism is not novel, and is fully disclosed on Page 52 of the previously mentioned NASA publication.

Figure 4:
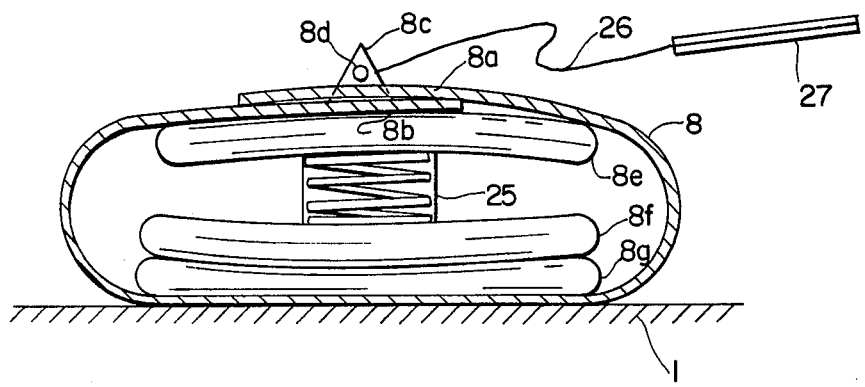
FIG. 4 illustrates a suitable external housed chute package, incorporating three sequenced chutes in a typical flapped personnel chute bag.
Figure 5:
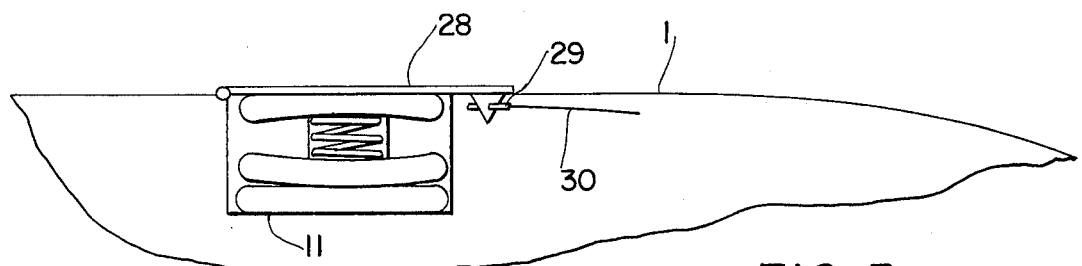
FIG. 5 is a diagrammatic illustration of a typical internally housed chute package.

FIG. 4 illustrates diagrammatically a typical external housed chute package. This may comprise a typical flapped personnel chute bag 8 attached to the skin of the fuselage 1, and being closed by overlapping inner and outer flaps 8a and 8b, these flaps being secured in the closed position by a perforated cone-like member 8c coupled to the inner flap 8b and passing through an opening in the outer flap 8a, with a metal latch pin 8d passing through the perforation in the cone-like member to secure the bag 8 in closed position. Pin 8d is attached to the end 26 of a shielded release cable 27 which extends to the cockpit. The bag 8 includes a first chute 8e which is deployable by a spring capsule 25, and subsequently deployable second and third chutes 8f and 8g. When the flaps are unsecured by removing pin or pins 8d through release cable 26, the flaps open, and chute 8e is deployed by spring capsule 25. In a known manner, chute 8e automatically deploys chute 8f at a point in time which produces the most optimum recovery effectiveness, this being accomplished with a static line of a predetermined length that is attached to the canopies of the first and second chutes. This static line is shorter than would be required to allow the first chute to be fully inflated, and the specific length is selected to control the integrated aerodynamic effect both chutes contribute to spin recovery. The third chute 8g, as well as any additional chutes, are sequentially deployed in the same manner by attaching further static lines in the same manner as between the first and second chutes. FIG. 5 diagrammatically illustrates a typical internally housed chute arrangement, the chutes being housed in a cylindrical container 11 within the fuselage of the aircraft, and normally closed by a hinged cover 28, secured by a latch shown generally at 29, and which is controlled by a release cable 30 which leads to the cockpit.

The chutes usually will collapse against the side of the fuselage during the spin recovery dive. Because there are and need be no riser lines, and since the suspension lines are short (because of the small diameters of the chute canopies), the collapsed chutes do not block the engine inlets nor do they interfere with pilot visibility. The collapsed chutes, however, are visible to the pilot. In any event, my invention permits the pilot the following three options after spin recovery: leaving the collapsed chutes outside the fuselage, releasing the chutes by opening the jaw clamp, or reeling in the chutes.

Figure 6:
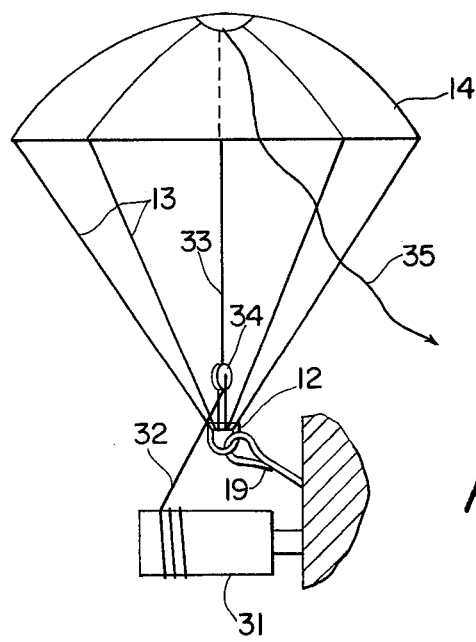
FIG. 6 is a diagrammatic illustration of a deployed chute coupled to the aircraft, showing also a suitable arrangement for collapsing and reeling in the chute after recovery from the spin.

The latter option, that of reeling in the chutes, is achievable through incorporation of a rotating drum or reel 31 as diagrammatically indicated in FIG. 6. In this figure, the releasable jaw clamp is schematically indicated at 19, coupled to the "D" ring 12 of a chute. The chute includes canopy 14 and suspension lines 13, and additionally includes a tether line 33 which is coupled to the center of the canopy, and passes therefrom downwardly through a guide and pulley 34 secured to ring 12, with the lower end 32 of tether line 33 being secured to drivable drum or reel 31. This reel or drum may be located anywhere inside the fuselage nose, and the tether line appropriately guided thereto. The tether line is of sufficient length to permit the chute to be completely inflated during spin recovery. As the tether is partially reeled in, the collapsed chute load is further reduced as the canopy of the chute is pulled inside-out and completely deflated. If desired, the chute can be reeled in completely by appropriately arranging the drum 31 and the internally packaged chute configuration.

FIG. 6 also indicates a static line 35 extending from the illustrated chute for coupling to a sequentially deployable chute.

It will be understood that normally the externally and internally housed chute will not be used together, although there is no reason why they cannot be so used. Typically, though not necessarily, the external package arrangement will be used for spin demonstration or test aircraft, whereas the internally housed chute package is appropriate for production aircraft. Particularly for the external package, a deploying spring capsule is not necessary, since centrifugal and aerodynamic forces are entirely adequate to deploy the chute or chutes from the bag.

The operation of the latch mechanism of FIG. 3 can be accomplished manually by the pilot or automatically, and the same is true for the deployment of the chute or chutes.

The basic concept of my invention involves the location of the spin recovery chute and the efficiencies and advantages which accrue therefrom, and it will be appreciated that this concept can be carried out with numerous forms of apparatus different from that specifically disclosed herein. Therefore, although the invention has been described with respect to exemplary embodiments thereof, it will be understood by those or ordinary skill in the art that variations and modifications may be effected within the scope and spirit of the invention without departing therefrom.

I claim:

1. A method of effecting recovery of a high speed aircraft from a condition of incipient or developed spin, comprising the step of, upon entry into said condition, deploying at least one parachute coupled only to the forebody of the aircraft forward of the center of gravity of the aircraft and being of a size such as to have a negligible influence on the free falling rate of sink of the aircraft while alleviating the spin condition.

2. A method as claimed in claim 1 further comprising deploying the spin condition is a flat spin.

3. A method as claimed in claim 1 wherein the dimensions of said parachute and its point of coupling to the aircraft are such that the deployed parachute can be collapsed against the side of the fuselage during a spin recovery dive without interfering with pilot visibility.

4. A method as claimed in claim 2 further comprising deploying a plurality of parachutes in sequence.

5. A method as claimed in claim 2 further comprising collapsing said parachute upon recovery from the spin.

6. A method as claimed in claim 2 further comprising releasing said parachute upon recovery from the spin.

7. A method as claimed in claim 2 further comprising collapsing said parachute upon recovery from the spin, and retracting the collapsed parachute.

8. A method as claimed in claim 7 wherein said collapsing and retracting are effected by reeling in a tether line attached to the inside surface of the parachute canopy.

9. A method as claimed in claim 1 wherein the maximum diameter of said parachute is 10 feet.

10. A method as claimed in claim 1 wherein the angle of attack and yaw rate of said aircraft are sensed, and said parachute is deployed at predetermined angle of attack and yaw rate.

11. A method as claimed in claim 10 wherein said parachute is coupled to the forward portion of the nose of said aircraft.

12. In a high speed aircraft, spin recovery apparatus comprising at least one deployable parachute located in the forebody of the aircraft and coupled only to the forebody of the aircraft forward of the center of gravity, the size of said parachute, when deployed for alleviation of a spin condition, being such as to have a negligible influence on the free falling rate of sink of the aircraft.

13. Apparatus as claimed in claim 12 wherein the maximum diameter of said parachute is 10 feet.

14. Apparatus as claimed in claim 12 wherein the dimensions of said parachute and its point of coupling to the aircraft are such that the deployed parachute can be collapsed against the side of the fuselage during a spin recovery dive without interfering with pilot visibility.

* * * * *